United States Patent
Martinod Restrepo et al.

(10) Patent No.: US 10,088,300 B2
(45) Date of Patent: Oct. 2, 2018

(54) SYSTEM AND METHOD FOR INSPECTING THE GEOMETRIC PARAMETERS OF THE WHEELS OF RAILWAY VEHICLES

(71) Applicant: UNIVERSIDAD EAFIT, Medellín (CO)

(72) Inventors: Ronald Mauricio Martinod Restrepo, Envigado (CO); German René Betancur Giraldo, Envigado (CO); Leonel Francisco Castañeda Heredia, Medellín (CO); Adalberto G. Díaz, Medellín (CO); Iván D. Arango, Medellín (CO)

(73) Assignees: Universidad EAFIT, Medellin (CO); Empresa de Transporte Masivo del Valle de Aburra Limitada—Metro de Madellin Ltda, Bello (CO)

( * ) Notice: Subject to any disclaimer, the term of this patent is extended or adjusted under 35 U.S.C. 154(b) by 196 days.

(21) Appl. No.: 14/778,239

(22) PCT Filed: Mar. 18, 2014

(86) PCT No.: PCT/IB2014/059951
§ 371 (c)(1),
(2) Date: Sep. 18, 2015

(87) PCT Pub. No.: WO2014/147563
PCT Pub. Date: Sep. 25, 2014

(65) Prior Publication Data
US 2016/0282108 A1    Sep. 29, 2016

(30) Foreign Application Priority Data
Mar. 18, 2013 (CO) .................... 13-053632

(51) Int. Cl.
*B61K 9/12* (2006.01)
*G01B 11/25* (2006.01)
(Continued)

(52) U.S. Cl.
CPC ............... *G01B 11/25* (2013.01); *B61K 9/12* (2013.01); *G01B 11/10* (2013.01);
(Continued)

(58) Field of Classification Search
CPC combination set(s) only.
See application file for complete search history.

(56) References Cited

U.S. PATENT DOCUMENTS

| 4,155,526 A | * | 5/1979 | Noble | .................... G01B 7/125 |
| | | | | 104/26.1 |
| 4,798,964 A | * | 1/1989 | Schmalfuss | .......... G01B 11/245 |
| | | | | 250/559.22 |

(Continued)

FOREIGN PATENT DOCUMENTS

| EP | 1614602 A1 | 1/2006 |
| ES | 2122876 B1 | 8/1999 |

(Continued)

*Primary Examiner* — Tsung-Yin Tsai
(74) *Attorney, Agent, or Firm* — The Morales Law Firm; Joseph L. Morales, Esq.

(57) ABSTRACT

The present invention relates to a system and method for the automated inspection of geometric parameters of railway wheels rolling on a track by artificial vision techniques. The present invention uses a structured light source (10) that illuminates a line of light (12) upon a fraction of the surface of revolution (3) of a wheel (1), a CCD camera (20), which captures an image (21) of the illuminated area, and a data processing system that records, digitalizes, geometrically corrects and reconstructs information of the surface of revolution (3) that is not recorded in the image (21), in order to obtain a numeric description of the complete transverse (Continued)

section of the wheel (1) represented by a reconstructed profilogram (500) for calculating the geometric parameters of the wheel (1).

12 Claims, 6 Drawing Sheets

(51) Int. Cl.
    *G01B 11/10*     (2006.01)
    *G01M 17/013*     (2006.01)
    *H04N 5/372*     (2011.01)
    *G06T 7/62*     (2017.01)

(52) U.S. Cl.
    CPC ............. *G01M 17/013* (2013.01); *G06T 7/62* (2017.01); *H04N 5/372* (2013.01); *G06T 2207/30252* (2013.01)

(56) References Cited

U.S. PATENT DOCUMENTS

| | | | | |
|---|---|---|---|---|
| 5,574,233 | A * | 11/1996 | Oliver | G01B 11/2408 324/207.14 |
| 5,636,026 | A * | 6/1997 | Mian | B61K 9/12 250/224 |
| 5,808,906 | A * | 9/1998 | Sanchez-Revuelta | G01B 11/25 250/200 |
| 2003/0072001 | A1 * | 4/2003 | Mian | B61K 9/12 356/446 |
| 2003/0160193 | A1 * | 8/2003 | Sanchez Revuelta | B61K 9/12 250/559.19 |
| 2004/0095585 | A1 * | 5/2004 | Nayebi | B61K 9/12 356/601 |
| 2007/0064244 | A1 * | 3/2007 | Mian | B61K 9/12 356/601 |
| 2007/0211145 | A1 * | 9/2007 | Kilian | B61K 9/04 348/148 |
| 2008/0212106 | A1 * | 9/2008 | Hoffmann | B23B 5/28 356/606 |
| 2012/0192756 | A1 * | 8/2012 | Miller | B61K 9/08 104/2 |
| 2013/0230212 | A1 * | 9/2013 | Landes | G06K 9/00791 382/104 |
| 2013/0313372 | A1 * | 11/2013 | Gamache | B61K 9/12 246/169 D |
| 2016/0031458 | A1 * | 2/2016 | Betancur Giraldo | B61K 9/12 73/146 |

FOREIGN PATENT DOCUMENTS

| | | | |
|---|---|---|---|
| WO | 1990012720 A1 | 11/1990 | |
| WO | WO 9012720 A1 * | 11/1990 | ............... B61K 9/12 |
| WO | 2001007308 A1 | 2/2001 | |
| WO | 2004046644 A2 | 6/2004 | |
| WO | 2004058554 A1 | 7/2004 | |

* cited by examiner

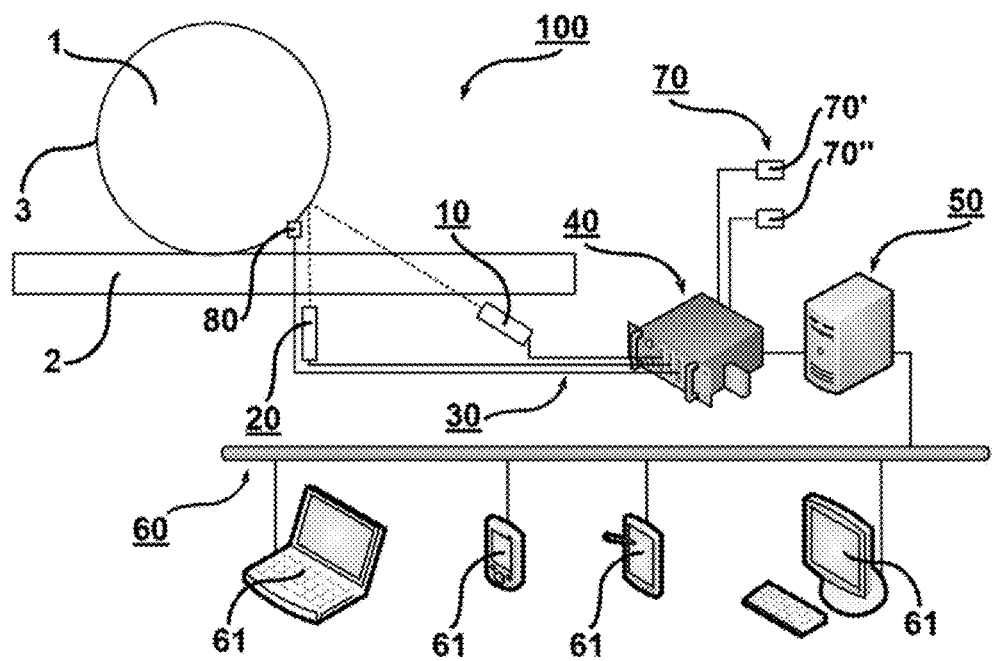
Fig. 1
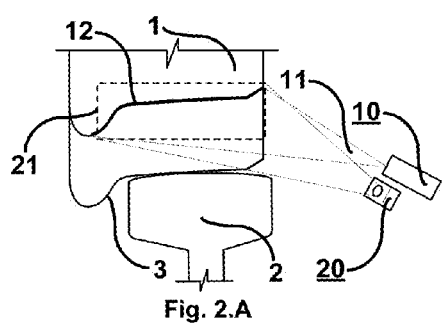
Fig. 2.A
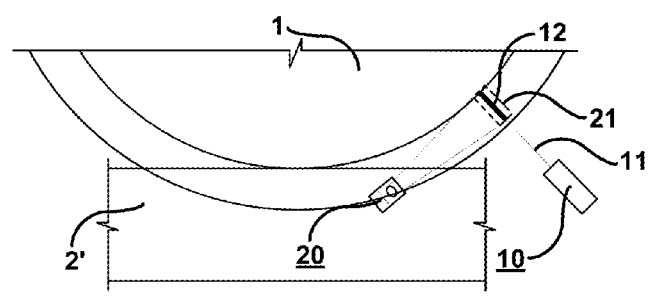
Fig. 2.B

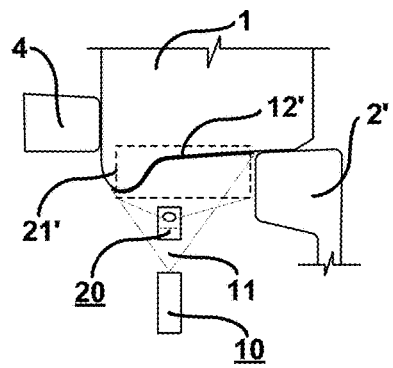
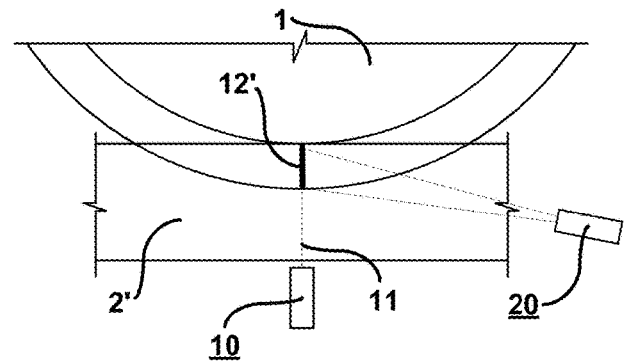
Fig. 3.A          Fig. 3.B
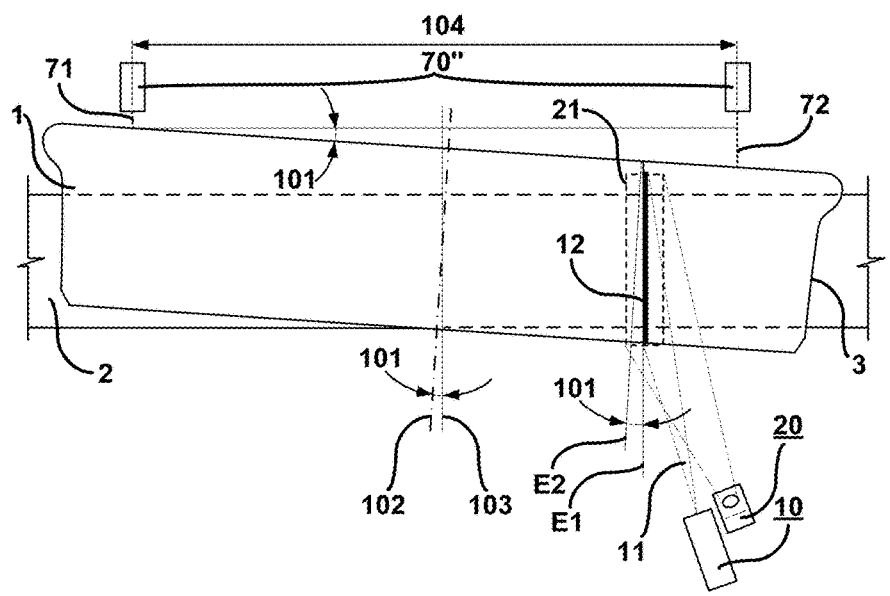
Fig. 4

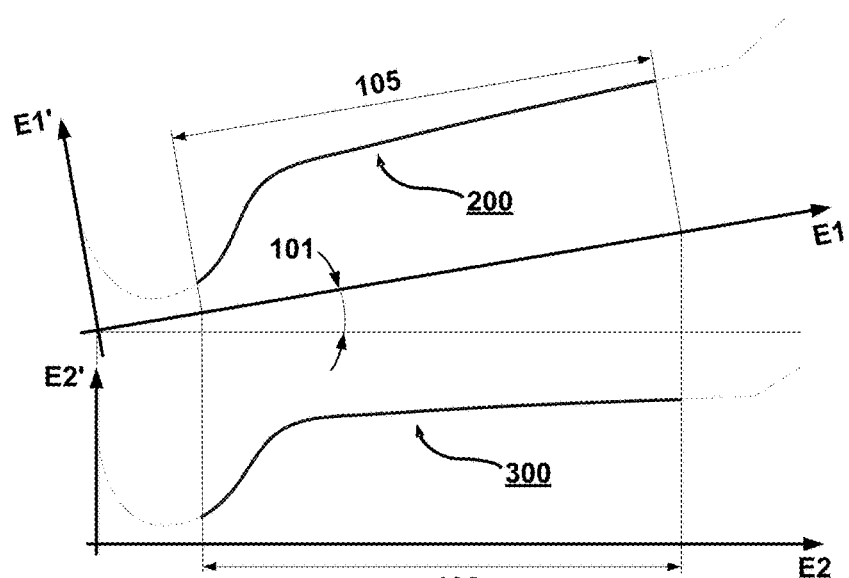
Fig. 5
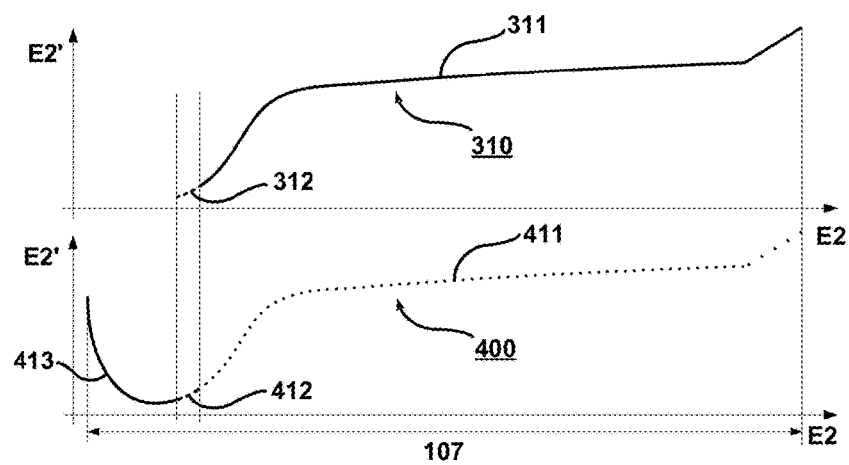
Fig. 6.A

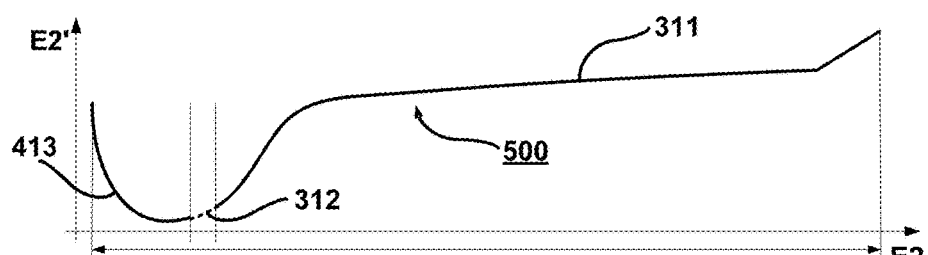
Fig. 6.B
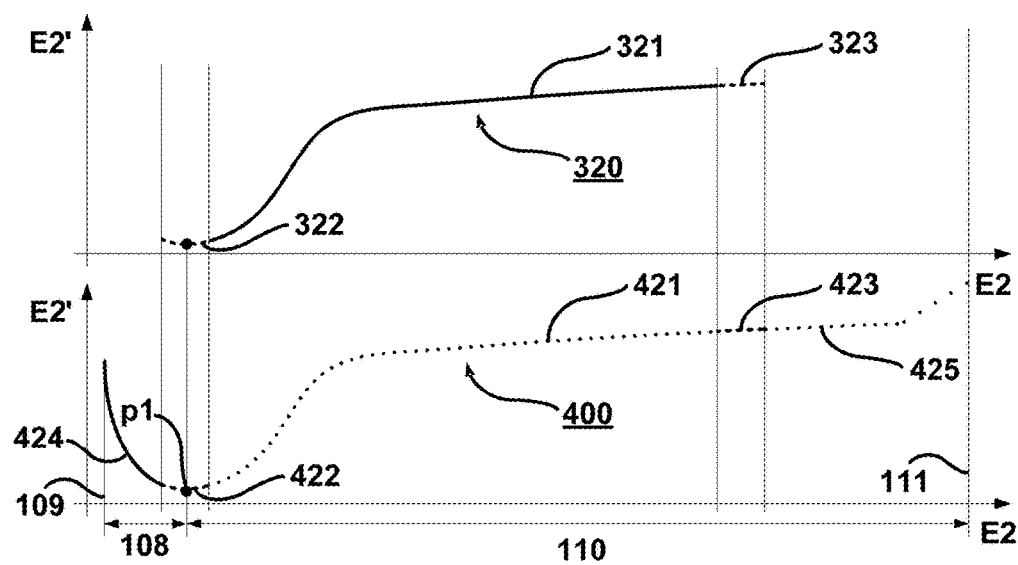
Fig. 7A
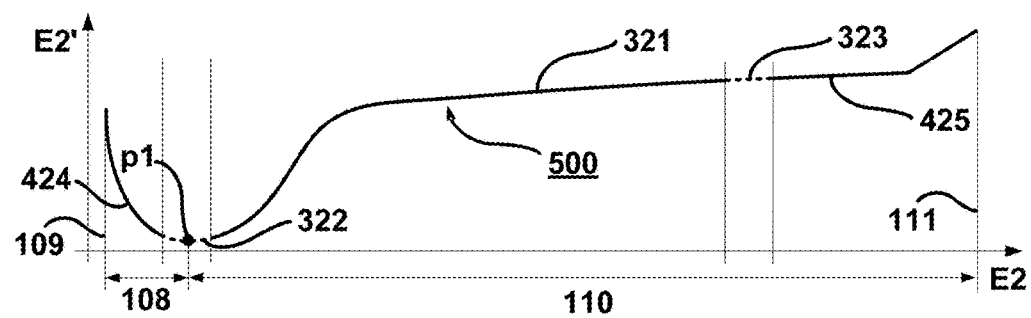
Fig. 7B

SYSTEM AND METHOD FOR INSPECTING THE GEOMETRIC PARAMETERS OF THE WHEELS OF RAILWAY VEHICLES

TECHNICAL FIELD

The present invention relates to systems for the automated inspection of the geometric parameters for wheels on railway vehicles that are in use, by using artificial vision techniques that allow obtaining a numerical description of the transverse profile of train wheels. It also finds the values of the geometric parameters of the wheel profile, allowing a comparison with other standard profiles or with historical data on profile measurement, aiming to determine deterioration rates, predict wheel condition, define the time for future inspections or infer the wear on the wheel.

BACKGROUND OF THE INVENTION

The surface wear of the tread in railway wheels is a known phenomenon. The wear results in an increase in cost of operation and a reduction in safety when the train is in motion. In order to mitigate this effect, rail operators must perform maintenance actions in order to preserve the tread profile parameters within the values set by railway norms.

For trains, the parameters have been defined as follows: wheel diameter, diameter difference between vehicle wheels, height and thickness of the flange, indirect measurement of the angle of the flange [qR], difference in profile reduction, difference in area reduction. These parameters determine the degree of wear on the wheel.

In this sense, it is necessary to inspect the condition of wheel profiles on the rolling stock in use, for which prior art has dealt with measurement by way of artificial vision systems, obtaining railway wheel profilograms through devices installed in special setups or on the tracks. In the present invention, rolling stock refers to any device capable of running on a railway.

U.S. Pat. No. 5,808,906 discloses a setup and procedure for measuring parameters on wheels by artificial vision. The document discloses two complementary devices for measuring wheel parameters; a first device is used to capture the transverse profile of the wheel, and a second, to measure the diameter of the wheel. The first device comprises a bearing support, on which the outermost part of the wheel is rolled, so that the tread surface to be measured remains free. On one side of the support, a wheel position sensor is placed, which sends a signal to a flat beam laser generator, which, with the help of a mirror (or with another laser generator), illuminates the entire transverse profile of the wheel. The profile image is captured by a camera equipped with an objective and a filter, and sends the image to an electronic device. The second device has the elements comprising the first device, but differs in that the second device records the image perpendicularly, requiring the wheel to roll on its flange. Therefore, the aforementioned document proposes a measurement procedure with two devices and in two stages; a first stage necessary for measuring the wheel profile, and a second stage, necessary for measuring its diameter. Furthermore, the previous invention discloses a measuring method comprising two different types of modified rail; the first rail is modified so that the wheel rests on its outer tread surface and the wheel profile parameters are found, and the second rail is modified so that the wheel rests on its flange and the diameter is measured. A first drawback of the previous invention is that there is a transition track section between the two types of modified rail, and the need for total modified rail section of great length demands significant intervention on a length of the track. Another drawback of the previous invention is that the measurement of wheel parameters cannot be done simultaneously, and furthermore, the sensors must be dispersed over a considerable length of track. Also, said document claims that the method for measuring the wheel's diameter is done with the wheel resting on its flange on a modified rail, with the help of a guardrail. Therefore, another drawback of the previous invention is that for a vehicle running in such conditions, train guidance on the track is eliminated, i.e. it is already known that the guidance in train motion is affected by the geometrical relation between the rails and the wheels. If such a relation were to be eliminated, a risk of derailment of the vehicle would be generated. Therefore, the previous invention violates the standards and regulations concerning railway vehicle safety. In the previous invention's setup, the use of two measuring devices in a two-phase measurement is inconvenient, as it comprises a complicated implementation, given the elements that belong to each of the measuring phases must be synchronized, and it also requires an extensive modification of the tracks in order to install both devices.

WO2004046644A2 discloses a method and system for measuring railway wheels using multiple light sources to illuminate portions of the wheels' surfaces. This document comprises at least three laser light sources and three cameras properly operating and in a synchronized fashion, recording three images in order to obtain at least one wheel parameter. One drawback of the aforementioned document is that the device has three sets of lasers and cameras that cannot be considered autonomous devices, capable of operating and processing data independently in order to obtain the measurements of the wheel. Obtaining profile data requires an adequate record of all three images in order to have any of the wheel's profile measurements. Additionally, the previous invention comprises a plurality of laser light sources each with a corresponding camera, so that each set records a different portion of the profile of the wheel. Therefore, image processing and the implementation of the system are more complex, and limited to the resolution and data transmission capacity from each camera to the data processor. The complexity in the system and image processing causes a decrease in the sampling frequency of images, turning these drawbacks into loss of precision in measuring the tread of the wheels. Additionally, this document discloses a measurement method comprising the use of calibration data, required for each of the three images from each laser and camera assembly. Therefore, another drawback is that the previous invention requires configuring the relative positions of every camera and its corresponding light source. Furthermore, it is necessary to calibrate the relative position of each camera and light source with respect to the wheels when the images are captured, demanding significant time for calibration.

US2008212106A1 discloses a method for further processing a wheel profile in order to determine wear. The profile data is used as a control variable for controlling a machine for surface machining of the wheel. The invention is characterized by the way the transverse wheel profile is recorded, i.e. by at least three laser devices, which project light beams upon areas that are located on three different sides of the wheel's surface. The previous invention comprises a number of measurements at different places on the wheel, requiring capturing measurements around the entire circumference of the wheel. The aforementioned invention captures the data with the wheel arranged in a lathe-type truing machine, a machining center, or the like. Therefore, a limitation of the previous invention is that the method for obtaining data cannot be performed if the wheel is set on the rolling vehicle on a track at running speed. Furthermore, the previous invention is characterized by the fact that the method comprises starting conditions for recording the wheel. Therefore, a drawback of the prior invention is that each wheel must be positioned on a test bench and meet conditions to start recording wheel data. Additionally, the previous invention is characterized by the fact that the method comprises rotating conditions for the wheel, determined by a set of signals. Therefore, a drawback of the prior invention is that wheel data recording must satisfy specific and controlled conditions during the test.

US2003160193A1 relates to the measurement of the rolling and turning parameters in railway wheels, using optical and artificial viewing techniques to obtain the record of both sides of the wheel. The previous invention comprises two line laser light sources, which must make a single line on the surface of the wheel. One drawback is that the laser light sources cannot be considered independent elements, able to operate independently for obtaining wheel measurements. Each laser light source must be positioned and pointed in a certain direction, and with such precision that the projected lines by each laser light source on the wheel profile satisfy two conditions: one condition is that lines must be arranged collinearly, and the other condition is that the lines must overlap, requiring a complex, precise and robust device assembly, in order to properly position the laser light sources. Furthermore, it is characterized by comprising a periscope consisting of two mirrors, or the like. This is poises a drawback, as it requires a complex and precise device assembly, in order to position the mirrors relative to the projected line on the wheel's surface, and relative to the camera. The previous invention is also characterized in that it uses mathematical algorithms to process a composite image consisting of a profile view of the wheel directly obtained from the camera and a second view acquired by a set of mirrors. The disadvantage is that for obtaining the wheel profile data, it is necessary to process an image with information from two profile sections, whereby both the image processing and the implementation of the data recording system become more complex and generate a loss of precision in measurement.

WO9012720 discloses an apparatus for examining, on the track, the profile of each of the wheels of a passing train comprising a light source positioned to project a line that extends transversely over the surface of the wheel to be captured by a camera. This document is characterized by comprising further means for measuring the diameter of the wheel, which is used to trigger the lighting unit. Additionally, the measuring tools comprise a further light source arranged to illuminate one side of the wheel and an additional camera positioned to capture a part of the rim area of the illuminated side of the wheel.

Other documents closer to the present invention are WO0107308A1, WO2004058554A1, EP1614602A1, which refer to systems for detecting the roundness of railway vehicle wheels, and have mechanical measurement systems that record the circumferential radius of the wheel flange top, based on the fact that the perimeter of railway wheel flanges are precisely round and that the shape of the flange is rarely affected or worn. Therefore, the flange is used as measurement data of the wheel's diameter. The present invention is also based on the measurement of the wheel flange top for obtaining the diameter of train wheels. However, the technological principles on which the prior art devices are based differ from those that have been used for the development of this invention. Moreover, although all these known devices are advantageous for detecting the diameter of the wheel, they do not, however, satisfy the current requirements, given the prior art measures a single parameter of the wheel to determine roundness.

Therefore, the devices and methods of the prior art are limited to the use of cameras for capturing an image thus recording the entire profile of the wheel or wheel diameter. The prior art makes use of a set of digitized images from two or more capturing cameras with two or more laser light sources or array of mirrors and other component images, so that each element captures a different part of the profile. This undoubtedly represents a high processing load on the set of images generated by each device as well as an increase of the complexity for the implementation of the devices. Therefore, there is a need for detection with high accuracy in measuring the geometric parameters of the wheel through a single partial profilogram representing a fraction of the contour of the revolution surface of the wheel, by reconstructing all the information pertaining to the transverse wheel profile recorded by way of image processing by a system able to use a single image from a single camera with a structured light source.

DESCRIPTION OF THE FIGURES

In order to supplement the invention's description and facilitate the interpretation of its main features, the following drawings are included:

FIG. 1 is a schematic representation for explaining the device for inspecting the condition of the geometrical parameters of railway wheels on rolling stock running on tracks.

FIG. 2.A is a basic representation, from the frontal view of the track, to explain the general arrangement of the recording elements on a regular track with commercial rails. Said arrangement is configured so that there is a light beam impacting on a fraction of the wheel profile being measured, and a camera to capture the fraction of the contour.

FIG. 2.B is a basic representation analogous to FIG. 2.A from the lateral view of the track.

FIG. 3.A is a basic representation, from the frontal view of the track, to explain the general arrangement of the recording elements in a special track with modified rails; said arrangement is configured so that there is a light beam impacting on a fraction of the wheel profile being measured, and a camera to capture the fraction of the contour.

FIG. 3.B is a basic representation analogous to FIG. 3.A from the lateral view of the track.

FIG. 4 is a basic representation, from the overhead view of the track, which shows a setup according to the invention in which the wheel is not aligned with respect to the rail, showing an angle of attack.

FIG. 5 shows a representation of two profilograms of a wheel, the profilogram located above illustrates a partial profilogram of the revolution surface of a wheel obtained by the device of the present invention, and the profilogram located at the bottom shows a partial profilogram with geometric corrections representing the actual dimensions of the transverse section of the wheel.

FIG. 6.A shows a representation of two profilograms of a wheel, the profilogram located above illustrates a partial profilogram obtained with a setup of the device in an ordinary track with commercial rails, and the profilogram located at the bottom illustrates a standard reference profilogram of wheel.

FIG. 6.B is a representation of the completed profilogram, obtained from the device set on an ordinary track with commercial rails, and reconstructed through the method that is the object of the present invention.

FIG. 7.A shows a representation of two profilograms of a wheel, the profilogram located above illustrates a partial profilogram obtained with a setup of the device on a special track with modified rails, and the profilogram located at the bottom, illustrates a standard reference profilogram of a wheel.

FIG. 7.B is a representation of the completed profilogram, obtained from the device set on a special track with modified rails, and reconstructed through the method that is the object of the present invention.

BRIEF DESCRIPTION OF THE INVENTION

Figure 8:
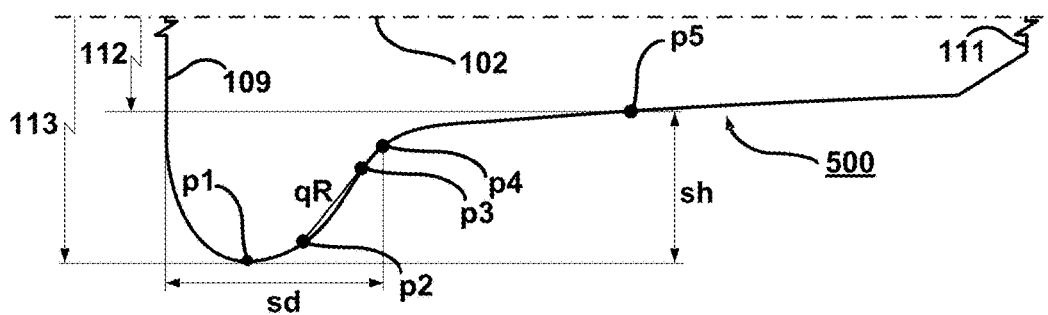
FIG. 8 is a representation of the completed profilogram obtained from the device, which shows the geometric parameters of the wheel, found by the method.

The present invention discloses a method and system for the automated inspection of geometric parameters of the wheel profile for rolling stock running on a railway track. The method comprises the following steps: a) generating a light beam by a structured light source on the partial transverse section of the wheel, so that the light beam impacts on the wheel as a line of light; b) capturing an image of the projected line of light on the transverse section of the wheel through a CCD camera; c) converting the image in a partial profilogram of the transverse section of the wheel by an artificial vision system; d) geometrically correcting the partial profilogram through a transformation of coordinate systems; e) reconstructing the partial profilogram by a geometric overlap of the matching sections of the partial profilogram and the standard reference wheel profilogram.

Also, the present invention discloses a system for the automated inspection of geometrical parameters of railway wheels of rolling stock running on a track, which comprises: i) a source of structured light that generates a light beam on a partial transverse section of the wheel, creating a line of light in that section; ii) a recording element of the light emitted by the structured light source, which in preferred embodiments is a CCD camera that captures an image of the lighted area; c) a data acquisition system that transmits information from the camera to a computer network that centralizes, manages and stores information of the measurement of geometric parameters of the wheel profile of rolling stock, and geometrically corrects and reconstructs information regarding the contour of the transverse section of the wheel that is not registered in the image, obtaining a numerical description of the complete transverse profile of the wheel, which is represented by a profilogram that is reconstructed in order to calculate the geometric parameters of the wheel.

DETAILED DESCRIPTION OF THE INVENTION

The present invention discloses a system and method for inspecting the condition of the geometrical parameters of each of the wheels of railway rolling stock running on a track. The present invention carries out an automated inspection on a track by way of an artificial visual measurement of the geometrical parameters of railway wheels on railway vehicles rolling on a track. Additionally, the system and method of the present invention allow capturing a partial contour on each train wheel, for a total reconstruction of its profile through image processing and obtaining the corresponding geometric parameters of the wheels.

Unlike the prior art, the present invention requires fewer elements for measuring the geometric parameters of railway wheels, reducing the complexity of system implementation for recording data, allowing the mathematical algorithms to process less information, which leads to a more accurate result in the measurement in relation to what is in the prior art. As will be explained in detail below, unlike the prior art, the present invention requires only to capture a fraction of the wheel profile, and from the image, the entire wheel profile is reconstructed, obtaining the geometric parameters.

The present invention allows obtaining a plurality of measurements and parameters from the wheel's profilogram that make possible to automatically inspect the geometrical conditions of the wheel tread. These parameters include: the diameter of the wheel, the difference in diameters of the vehicle wheels, the height and thickness of the flange, the indirect measurement of the flange [qR], the difference in profile reduction, and the difference in area reduction. Unlike what is stated in the prior art, the present invention discloses a device comprising the use of a single capturing camera and a single structured light source to find the parameters of the transverse section of the wheel, as well as the wheel diameter.

Unlike what is taught by prior art, the present invention makes use of artificial vision for measuring wheel diameter by recording the wheel flange from a profilogram of the transverse profile of the wheel, which contains, additionally, all the geometrical parameters for wheels of railway vehicles circulating on tracks, in order to determine the process of wheel wear.

The present invention calculates the wheel's diameter by the ratio of two values belonging to the wheel's geometry. A first value is the flange height, obtained from the information contained in the reconstructed profilogram. A second value is the circumferential radius of the wheel flange top, which has an invariable value given the perimeter of the flange top of the wheels of the railways are precisely round, and the flange top is not affected or subject to wear, so it is obtained from a standard value, which in the preferred embodiment can be defined by the theoretical geometry of the wheel, by the manufacturer's geometry of the wheel, or by a reference value of a standard wheel. The value of the diameter of the wheel is the remainder of the difference between the values of the circumferential radius of the flange top and flange height.

In a first aspect, and with reference to FIG. 1, the present invention relates to a device (100) comprising an array with two recording elements (10, 20). The first recording element consists of a structured light source (10), as a laser flat beam generator. The structured light source (10) projects a line (12) of light that impacts on the revolution surface (3) of a wheel (1) rolling on a track on a rail (2). The second recording element consists of a CCD camera (20), which in preferred embodiments may have an effective resolution of 1600×1200 ppp or above, a minimum image capture speed of 66 fps, a 35 mm focal distance lens, a sensor size of ⅔ and a cell size of 5.5 μm. The CCD camera (20) records an image (21) of the line of light (12) corresponding to a fraction of the contour of the wheel (1).

FIG. 1, shows the arrangement with two recording elements (10, 20) coupled to a means for transmitting data (30) from a data acquisition system (40), which transmits to system for data processing and computation (50) and has connectivity with a computer network (60) that allows user interaction (61). The present invention also allows integrating other measurement data from other measuring equipment (70) by adding modules to the data acquisition system (40).

Relating to the device of the present invention, a position sensor (80) that can be photoelectric by barrier or reflection, or by mechanical switches, detects the presence of the recording elements (10, 20), and produces a signal when the signal from the recording elements (10, 20) is obtained by measuring the location of the vehicle on the track, by each wheel of the running vehicle, when it is in the adequate position to be measured. As soon as the vehicle wheel rolls, a controller synchronizes the projection of the structured light (10) and activates recording of the CCD camera (20) so that it takes information from the vehicle wheel instantly.

The device of the present invention can be installed in any type of track, which will be specified bellow. The arrangement of the recording elements (10, 20) is duplicated in the second rail of the track, but in an opposite manner, to record the opposite wheel. The other elements are common to all the wheels being measured. The setup according to the present invention may also be configured in different types of tracks, including but not limited to:

According to FIG. 2.A and FIG. 2.B, the setup may be configured on a regular track with commercial rails (2), which are manufactured with standard materials and standard rail geometry elements, in which case the structured light source (10) and the CCD camera (20) must be set on the outer side of the track, in order to project the beam (11) that illuminates the line (12) and capture the image (21);

According to FIG. 3.A and FIG. 3.B, the setup may be configured on a special track comprising tread support specially designed or modified rails (2'), on which the outer section of the tread surface of the wheel to be measured is rolled, and which has a counter-rail (4) that prevents derailment, therefore leaving the tread of the wheel free so that the structured light source (10) and the CCD camera (20) can be arranged just under the wheel, in order to project the beam (11) that illuminates the line (12') and capture the image (21').

An alternative setup of the invention comprises multiple arrays of recording elements (10, 20), installed on different tracks within a railway system, wherein each array is autonomous, able to work independently, or they can be integrated as a unit within a single device that centralizes, manages and stores information. Therefore, the device unit (100) of the present invention can be constituted by a set of information, based on information from various measuring cells comprised of sensory arrangements in rails or based on artificial vision.

In another embodiment, and an option to the present invention, the device (100) may include the integration of different types of devices from other measuring equipment (70), in order to provide additional data, such as:

A vehicle identification device (70'), see FIG. 1, for recording information about each vehicle sensed. The vehicle identification device may be based on radio frequency technology comprising a set of tags and an antenna integrated to a reading device. Each vehicle has a tag attached that stores a vehicle identification code and information on the condition of its wheels (1), which allows an individual reading of each vehicle and to assign the record of each measurement according to the specific characteristics of rolling stock: type of vehicle (passenger, cargo, auxiliary), number of cars, number of axles, number of wheels; or includes the possibility of cross-checking information between the sequence of measurements acquired using a record containing the sequence of the vehicles that have circulated on the track; or An array of non-contact distance sensors (70"), see FIG. 1, arranged transversely on the track to record the distance between the inner sides of the wheels of an axle, or to measure the angle of attack (101) of a wheel (1) against a rail (2); integration is possible as the data acquisition system (40) allows integrating other measurement data from other measuring equipment by adding modules.

Method

Secondly, the present invention relates to a method by which the captured image (21) is processed in real time by the data processing and computing unit (50). The method involves the following general steps:

a) generating a light beam by a structured light source on the partial transverse section of the wheel, so that the light beam impacts on the wheel as a line of light;

b) capturing an image of the projected line of light on the transverse section of the wheel through a CCD camera;

c) converting the image into a partial profilogram of the transverse section of the wheel by a machine vision system;

d) geometrically correcting the partial profilogram through a transformation of coordinate systems; and e) reconstructing the partial profilogram by a geometric overlap of the matching partial profilogram sections with the reference profilogram of a standard wheel.

The method comprises appropriate mathematical algorithms that compensate for optical defects, discriminating the setup according to the type of track:

With reference to FIG. 2.A and FIG. 2.B, the setup arranged on a regular track with commercial rails (2) has an advantageous setup, as it has an easier installation, but it must carry out more robust data processing in order to correct significant effects of perspective, due to the orientation of the plane of image capture (21) relative to the plane of the surface of revolution (3) of the wheel (1); and With reference to FIG. 3.A and FIG. 3.B, the setup arranged in a special track with modified rails (2') has a more complex setup procedure, but allows for more agile data processing, as the effects of perspective are subtle, as the plane of image capture (21') coincides greatly with the plane of the CCD camera (20);

Thus, the image (21 or 21') records a fraction of the surface of revolution of the wheel generated by the light beam (12 or 12'), and then the image is transmitted to an artificial vision system that transforms the image into a partial profilogram (200) of the contour of the wheel that has the actual units of measure.

The setup of the present invention may be provided with a counter-rail (4), shown in FIG. 3.A, or other means adapted to align the wheel to the rail upon measurement. However, the method of the present invention also allows the setup to be performed in a way devoid of means for aligning the wheel to the rail.

FIG. 4 shows the case where the setup is arranged in a way devoid of means for aligning the wheel to the rail, and therefore the wheel (1) may have an angle of attack (101) formed by the angular deviation between the axis of symmetry (102) of the wheel (1) with regard to the transversal axis (103) of the rail (2).

In this case, the structured light source (10) projects a beam of light (11) that impacts as a line of light (12) on the wheel (1) in the direction E1, which coincides with the direction of the axis (103) of the rail (2). Then, the angle of attack (101) of the wheel (1) is found, in order to relate the direction E1 of the line of light (12) registered by the device (100), to the direction E2 defining the transverse section of the wheel (1) that is being measured. The angle of attack (101) is found by integrating an array of two contactless distance sensors (70") disposed transversely on the track to record the distances (71 Y 72) of the internal side of the wheel (1). The relationship between the distances 71 and 72, alongside the geometrical arrangement (104) of the sensory array (70"), allows the angle of attack (101) of the wheel (1) to be found at the time of acquiring data from the array of recording elements (10, 20).

Being a solid body with a basic shape, substantially cylindrical or annular, such as a wheel (1) of a railway vehicle, the line of light (12) projected on the surface of revolution (3) of the cylinder or ring in the direction E1 may be transformed to the direction E2, which corresponds to the transverse section of the wheel (1), by a geometrical projection of the line of light (12) contained in the direction E1, projected to direction E2.

FIG. 5 shows a partial profilogram (200) captured by the device (100) that numerically describes the shape of the surface of revolution (3) of a wheel (1) in the direction E1, corresponding to the record of a wheel (1) rolling on a rail (2) with an angle of attack (101). The partial profilogram (200) is geometrically corrected through data processing similar to a transformation of a coordinate system, obtaining the partial profilogram (300) that corresponds to the profile of the transverse section of the wheel (1) in the direction E2. Said transformation can be performed by numerical methods of linear projection, methods of non-rigid geometric transformation, proportional relationships or other similar methods, using the value of the angle of attack (101). Therefore, the length (105) of the partial profilogram (200) is converted into the length (106) of the partial profilogram (300) corresponding to the true length of the transverse section of the wheel (1).

FIG. 6.A shows the geometric relation between two profilograms, a first partial profilogram (310) obtained from a record of a wheel in a setup arranged on a regular track with commercial rails (2). The partial profilogram (310) comprises the record of the tread surface and a portion of the wheel flange, which is divided into two sections (311 and 312). Then, a second reference profilogram (400) from a standard wheel profile, which is divided into three sections (411, 412 and 413). The limit (107) defining the width of the wheel, has a fixed value not affected by wear due to wheel rolling on the rail, thus the limit (107) allows locating the partial profilogram (310) relative to the reference profilogram (400).

The method of the present invention is based on the fact that the wheel flange is not affected by wear on its circumference, hence the fraction of the flange unrecorded in the partial profilogram (310) can be reconstructed through the corresponding section (413) of the reference profilogram (400), and also the fraction of the wheel flange (312) must match the section (413) of the reference profilogram (400).

FIG. 6.B schematically presents the construction of the reconstructed profilogram (500) consisting of sections 311, 312 and 413. Sections 311, 312 and 413 are obtained from the partial profilogram (310), by geometric superposition of overlapping sections (312 and 412), as shown in FIG. 6.A.

Likewise, FIG. 7.A shows the geometric relationship between two profilograms; a first partial profilogram (320) obtained from a record of a wheel through a setup arranged on a special track with modified rails (2'), the partial profilogram (320) comprises the record of a fraction of the tread surface and the wheel flange, which is divided into three sections (321, 322 and 323). Then, a second reference profilogram (400) from a standard wheel profile, divided into five sections (421, 422, 423, 424 and 425). The limit (108), defined as the horizontal distance between the inner face of the wheel (109) and the top of the flange (p1), and the limit (110), defined as the horizontal distance between the outer face of the wheel (111) and the top of the flange (p1), have fixed values that are not affected by wear due to wheel rolling on the rail, thus allowing to locate the partial profilogram (320) relative to the reference profilogram (400).

According to the method of the present invention, firstly, the fraction of the flange unrecorded in the partial profilogram (320) can be construed through the corresponding section (424) of the reference profilogram (400), and the fraction of the wheel flange (322) must match the section (422) of the reference profilogram (400); secondly, the outer fraction of the tread surface unrecorded in the partial profilogram (320) can be construed through the corresponding section (425) of the reference profilogram (400), and the fraction of the tread surface (323) must match the section (423) of the reference profilogram (400).

FIG. 7.B schematically presents the construction of the reconstructed profilogram (500) consisting of sections 321, 322, 323, 424 and 425. Sections 321, 322, 323, 424 and 425 are obtained from the partial profilogram (310), by geometric superposition of overlapping sections (322 y 422, 323 y 423), as shown in FIG. 7A.

The method of the present invention comprises overlapping sections of matching (312 and 412) shown in FIG. 6A, or overlapping sections (322 and 422, 323 and 423) shown in FIG. 7A, the overlapping of sections can be performed using a numerical process that may be based in the field of computational geometry, or a statistical process such as maximum correlation, or a process of pattern recognition with artificial intelligence using artificial neural networks or the like, implemented in the data processing and computing system (50) shown in FIG. 1

The method of the present invention comprises the application of first-order or higher numerical interpolation methods, to find control points (p1, p2, p3, p4 and p5) in the reconstructed profilogram (500) see FIG. 8, and obtaining the values of the geometric parameters of the wheel profile: flange height (sh), thickness of the flange (sd), indirect measure of angle of the flange (qR), difference in profile reduction, difference in area reduction.

The method of the present invention comprises measuring the wheel diameter (112), by the difference between the distances of circumferential radius of the flange top (113) and the flange height (sh). The circumferential radius of the flange top (113), defined as the distance between the axis of symmetry of the wheel (102) and the top of the flange (p1), has the standard reference value of the wheel, as the wheel flange does not suffer wear on its circumference.

The present invention allows for statistical measurements, by recording and storing data recorded in a database, which allows analysis of historical signals of each wheel and of each train, in order to record sufficient data in a period of time, in order for it to be possible to analyze trends, predict wheel conditions, and infer deterioration rates.

The present invention allows for the reconstructed profilogram (500) to be compared to a reference profilogram (400) making it possible to cross-check the respective differences, which represents a measure for wear that has occurred or a measure for inspecting the amount of wear occurred on the wheel, and finding the degree of wear relative to a tolerable range that has been set. Through correlative links between the effective work period on the wheel and the measured wear, it is possible to make a prediction about the period that the wheel may be subject to work or to determine the next inspection time for the device (100).

Example of the Preferred Embodiment of the Invention

In what follows, the invention will be additionally described and in a more detailed manner, only as an example and referring to the attached drawings.

In a preferred embodiment, the device (100) comprises two recording elements (10, 20). A profile laser (10) with a visible red line beam of class 3B type diode with uniform intensity distribution, with a line width of 2 mm from a distance of 3 m, a wavelength of 635 μm, a minimum power of 30 mW, a line width of less than 2 mm, a fan angle of 85° and 0.5 mrad divergence. The second recording element is a high-speed CCD type ⅔ in (8.8×6.6 mm) digital camera with a resolution of 1600×1200 (20). The camera (20) has a lens with a focal distance of 35 mm, a range of iris F1.4~F22 a focus range ∞~0.2 mm, a horizontal field of view 80 mm and a vertical field of view 40 mm. In other embodiments, the camera (20) may have an effective resolution of 1600× 1200 ppp or higher, a minimum capture speed of 66 fps, a 35 mm focal distance lens, a sensor size of ⅔ and a cell size of 5.5 μm.

The device (100) further comprises a position sensor (80), consisting of a photoelectric barrier type detection sensor with a detection range of 15 m and a maximum response time of ≤200 ρs. The sensor (80) comprises a source of visible red laser light with a wavelength of 650 nm, which operates in conjunction with a refractive heavy-duty adhesive tape.

The data acquisition system (40) contains a collection module of artificial vision, comprising a capture card that has a dual Gigabit Ethernet controller port to transfer images to a full-bandwidth Gigabit Ethernet on both ports simultaneously.

The device (100) allows the possibility of integrating directly to the data acquisition system (40), an automatic identification system of vehicles (70'), which comprises a computer type radio frequency identification, called RFID.

Likewise, the device (100) allows the possibility of integrating directly to the data acquisition system (40) an array of non-contact distance sensors (70") for recording the distance between the inner sides of the wheels of an axle or to measure the angle of attack (101) of a wheel (1) against a rail (2). The sensors (70") consist of a laser distance meter type class 2 diode with a 10 mm measuring range, a resolution 0.2 μm and a sampling frequency of 4 kHz.

Figure 9:
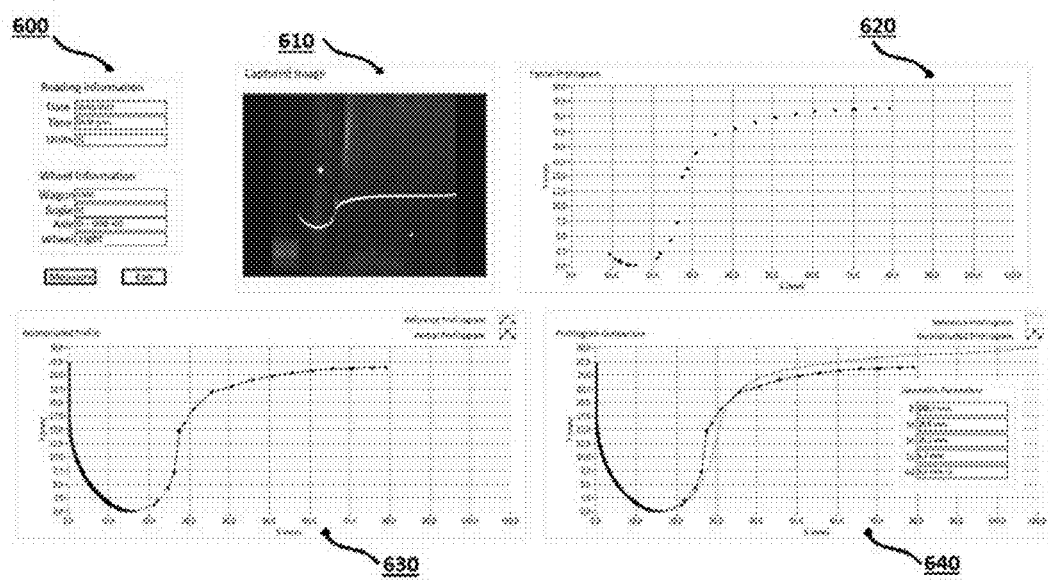
FIG. 9 is an example of the GUI, which schematically shows a measurement result obtained with the present invention.

FIG. 9 shows an alternative of the GUI (600), with the purpose of showing a result obtained from a measurement made with the present invention. The measurement was done on a wheel (1) having a nominal diameter of 848.2 mm, made of steel R8T (UIC 812) and a NRC geometric profile, belonging to the fleet of public railway transport that operates in the city of Medellin (Colombia), a three-car passenger vehicle, the mechanical components were originally manufactured by the company MAN, which became part of the company Adtranz and later Bombardier Transportation. The vehicle has a similar geometry and design to ET420 units, operated until recently by Deutsche Bahn (e.g.: Munich S-Bahn).

With the preferred embodiment of the invention, a measurement is performed using the two recording elements (10, 20) coupled to the data acquisition system (40) that transmits to a data processing and computing system (50), which it is connected to a computer network (60) that allows user interaction (61) by using the graphical user interface (600).

The graphical user interface (600) shown in FIG. 9 comprises sections 610, 620, 630 and 640. Section 610 schematically shows the type of images captured by the camera, contains the record of an image (21) captured by the CCD camera (20) upon measurement. Image (21) shows the line of light (12) generated by the profile laser (10) linear beam. The line of light (12) corresponds fraction of the contour of the surface of revolution (3) of the wheel (1).

Section 620 contains the graphic representation of the partial profilogram (300) obtained from the transformation of the image (21) by artificial vision processing. Section 630 contains the graphical representation of the reconstructed profile (500) obtained from the partial profilogram (300). Section 640 shows the measurements obtained from the reconstructed profile (500), defined as the geometric parameters of the wheel profile: flange height (sh), thickness of the flange (sd) indirect measurement of angle of the flange (qR), area difference reduction (Ad), and for the measurement done the diameter of the wheel is also obtained.

FIG. 9 also shows that the reconstructed profilogram (500) may be compared to a reference profilogram (400), or to several reference profilograms, which can preferably be theoretical values, but could also be a set of stored data corresponding to previous measurement values, so as to provide information about the extent of wear that has occurred since those preliminary measurements.

The foregoing description of the invention made reference to what constitutes the preferred exemplary embodiment. However, modifications in form and detail, as well of the arrangement of components, may be made in the setup described and illustrated, without departing from the scope of the invention. Therefore, it is intended that the scope of the invention be limited solely by the content of the appended claims.

The invention claimed is:

1. A method for measuring geometric parameters of wheel profiles of rolling stock running on a track on railways, comprising:
   a. generating a light beam by one structured light source on a partial transverse section of a wheel comprising a tread surface and a flange, so that the light beam impacts on a portion of the tread surface and a portion of the flange of the wheel as a line of light;
   b. capturing an image of the projected line of light on the transverse section of the wheel with one recording element;
   c. converting a captured image of the partial transverse section of the wheel in a partial profilogram by an artificial vision system, wherein the partial profilogram comprises a flange top;
   d. identifying a reference profilogram, wherein the reference profilogram comprises a flange top which is the same flange top than the partial profilogram;
   e. constructing a reconstructed profilogram by completing the partial profilogram with the reference profilogram, wherein the missing portions of the partial profilogram are provided by the reference profilogram.

2. The method of claim 1, wherein a horizontal distance between an inner side of the wheel and the flange top, and a horizontal distance between an outer side of the wheel and the flange top remain fixed, allowing the construction of the reconstructed profilogram.

3. The method of claim 1, wherein the construction of the reconstructed profilogram is performed by numerical processes selected from the group consisting of: computational geometry, statistical processes, and pattern recognition processes with artificial intelligence using artificial neural networks.

4. The method of claim 1, which also comprises measuring the wheel diameter by the difference between the distances of circumferential radius of the flange top and a flange height (hs).

5. The method of claim 1, wherein prior to the light generating step (a), the method comprises the following step:

measuring an angle of a transverse axis of the wheel in relation to a transverse axis of the rail by an arrangement of distance sensors, measuring the distances inside of the wheel together with the geometrical arrangement of said sensors.

6. The method of claim 1, wherein the wheel comprises a width of the wheel, and the width of the wheel remains fixed, allowing the construction of the reconstructed profilogram.

7. The method of claim 1, wherein the missing sections of the partial profilogram correspond to a section of the flange and a section of the outer fraction of the tread surface provided by the reference profilogram.

8. A system for measuring geometric parameters of wheel profiles of rolling stock running on a track on railways, comprising:

a. an autonomous array of recording elements consisting of:
  i. one structured light source that generates a light beam on a partial transverse section of the wheel, so that the light beam impacts on the wheel as a line of light; and
  ii. one element for capturing an image of the partial transverse section of the wheel lighted by the structured light source; and
b. a system of data acquisition that:
  i. transmits information from the autonomous array to a computer network, wherein the computer network geometrically corrects a partial profilogram through a transformation of coordinate systems; and
  ii. constructs a reconstructed profilogram by identifying a reference profilogram based on the partial profilogram, and completing the missing portions of the partial profilogram provided by the reference profilogram.

9. The system of claim 8, wherein the structured light source is a flat beam laser generator type.

10. The system of claim 8, wherein the element for capturing an image is a capture camera.

11. The system of claim 8, wherein the data acquisition system is connected to an array of non-contact distance sensors disposed transversely on the track to measure the distance between the inner sides of the wheels of an axle.

12. The system of claim 8, wherein the data acquisition system is connected to an array of distance sensors arranged transversely on the track to measure the angle of attack of a wheel.

* * * * *